Aug. 23, 1932.                H. R. CRAGO                 1,872,681
                           ELECTRIC REGULATOR
                           Filed April 17, 1931
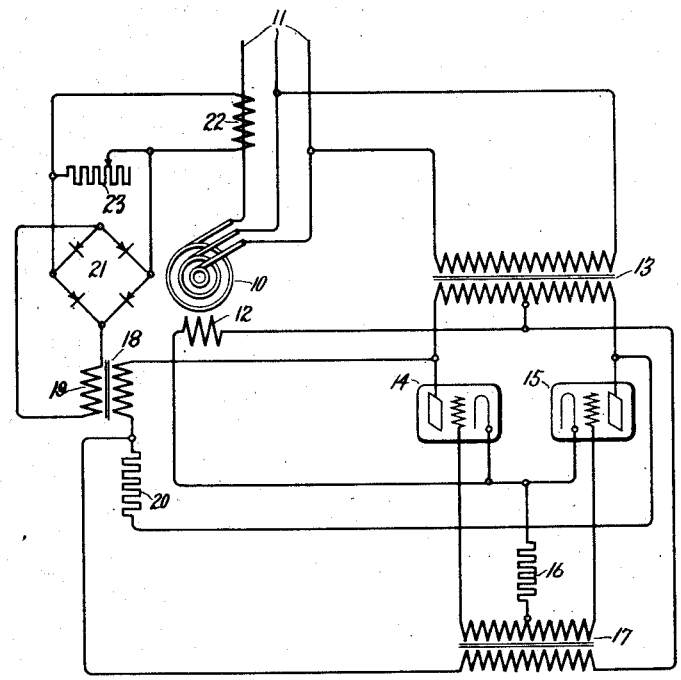
Inventor:
Harry R. Crago,
by Charles E. Mullan
His Attorney.

Patented Aug. 23, 1932

1,872,681

UNITED STATES PATENT OFFICE

HARRY R. CRAGO, OF SCHENECTADY, NEW YORK, ASSIGNOR TO GENERAL ELECTRIC COMPANY, A CORPORATION OF NEW YORK

ELECTRIC REGULATOR

Application filed April 17, 1931. Serial No. 530,890.

My invention relates to regulators for dynamo-electric machines and more particularly to such regulators which do not involve the use of moving parts or contacts.

It is well known in the art that, in the operation of synchronous dynamo-electric machines connected to alternating current systems, the field excitation of the machines should be varied in accordance with the variations in the load on the machine in order for the best operating conditions to obtain. That is, with an increase in load on the machine the field excitation of the machine could be increased in order to increase its torque proportionately and to maintain its power factor constant. Heretofore there have been devised various arrangements for regulating the field excitation of a synchronous machine in accordance with the load on the machine, but many of these arrangements have involved the use of moving parts and contacts and have been incapable of producing the fine degree of regulation essential to satisfactory operation.

It is an object of my invention to provide an improved regulating circuit for a synchronous dynamo-electric machine in which the field excitation is regulated automatically in response to variations in load on the machine and in which the desired regulation is effected by means of electric valves In accordance with my invention the field winding of a dynamo-electric machine is energized from an alternating current circuit through a controlled rectifier. The output of the rectifier is controlled by energizing the grids of the rectifier valves from an impedance phase shifting circuit. This phase shifting circuit includes a saturable reactor, the saturating winding of which is energized from a current transformer connected in the armature circuit of the machine through a rectifying device. A variation in the armature current varies the saturation of the reactor which tends to shift the phase of the grid potentials of the rectifier valves to correspondingly vary the excitation of the machine.

For a better understanding of my invention together with other and further objects thereof, reference is had to the following description taken in connection with the accompanying drawing and its scope will be pointed out in the appended claim. The single figure of the accompanying drawing is a diagrammatic representation of my invention as applied to the regulation of the excitation of a synchronous dynamo-electric machine.

Referring more particularly to the drawing I have illustrated an arrangement for regulating the excitation of a synchronous dynamo-electric machine 10 in accordance with variations in the current flowing between the machine 10 and a three phase alternating current circuit 11 to which it is connected. In accordance with this arrangement the field winding 12 of the machine 10 is energized from the circuit 11 through a full wave rectifier comprising a transformer 13 and electric valves 14 and 15 connected in a conventional manner for full wave rectification. Electric valves 14 and 15 are each provided with an anode, a cathode and a control grid and may be of any of the several types well known in the art though I prefer to use valves of the vapor electric discharge type in which the starting of current in a valve is determined by the potential on its control grid but in which current through the valve may be interrupted only by reducing its anode potential below the critical value. The grids of electric valves 14 and 15 are connected to the common cathode connection through a current limiting resistor 16 and opposite halves of the secondary winding of a grid transformer 17. In order to control the output of the above described rectifier circuit, an arrangement is provided for shifting the phase of the grid potentials of electric valves 14 and 15 with respect to their anode potentials. This phase shifting circuit comprises a reactor 18 provided with a saturating winding 19, and a resistor 20 serially connected across the secondary winding of transformer 13. The saturating winding 19 of reactor 18 is energized through a rectifier bridge 21 from the secondary winding of a current transformer 22 connected in the alternating current circuit 11. The rectifier bridge 21 may preferably comprise four contact rectifiers connected in a well known manner to provide a direct current across one diagonal when an alternating current is impressed across the other diagonal. If desired, a variable resistor 23 may be connected across the secondary winding of current transformer 22 in order to provide any desired regulating characteristics of the apparatus. The primary winding of grid transformer 17 is connected between the midpoint of the secondary winding of transformer 13 and the junction of resistor 20 and reactor 18 so that the phase of the potential applied to the grid transformer 17 will vary in accordance with the saturation of reactor 18 as will be well understood by those skilled in the art. However, this particular phase shifting circuit comprises no part of my present invention, but is disclosed and claimed in a copending application of Myron Zucker, Serial No. 530,878, filed April 17, 1931 and assigned to the same assignee as the present application, which also broadly claims the control of the excitation of a dynamo electric machine by means of an electric valve and an impedance phase shifting circuit the impedance of one element of which is controlled by the armature current of the machine. Moreover the feature of controlling the excitation of a synchronous dynamo electric machine by means of a grid controlled electric valve the phase of the grid potential of which is varied in response to the armature current of the machine is disclosed and broadly claimed in the copending application of Myron Zucker, Serial No. 530,877, filed April 17, 1931, also assigned to the same assignee as the present application.

In explaining the operation of the above described apparatus, it will be assumed that, with normal load flowing in the alternating current circuit 11, the saturation of reactor 18 and hence the phase of the potential applied to the grids of electric valves 14 and 15 has such a value as to maintain the correct excitation of the field winding 12. It is a well known fact that, if the machine 10 is operating as a synchronous motor receiving energy from the alternating current circuit 11, or if it is operating as a synchronous generator delivering energy to an alternating current system 11, with an increase of load on the machine, the excitation must be correspondingly increased in order to secure the desired stability of the machine 10 and an economic power factor of the load current. In the arrangement illustrated, it will be noted that, with an increase in the current in the alternating current circuit 11, the potential across resistor 23 is correspondingly increased and hence the saturation of reactor 18. An increase in the saturation of reactor 18 decreases its impedance. A decrease in the impedance of reactor 18 causes the phase of the potential between the midpoint of the secondary winding of transformer 13 and the junction of reactor 18 and resistor 20 to be advanced with respect to potential of the secondary winding of the transformer 13. That is, the grid potentials of electric valves 14 and 15 are advanced with respect to their anode potentials so that these valves become conducting at an earlier point in their respective half cycles and the average current output of the rectifier arrangement is increased and, thus, the excitation of the field winding 12. Obviously with a decrease in the current in the circuit 11 a reverse operation will take place.

While I have illustrated my invention as applied to a synchronous dynamo-electric machine it is obvious that it may be applied to any type of an alternating or direct current dynamo-electric machine when the field circuit is energized from an alternating current source and it is desired to regulate the field excitation in response to the load on the machine. In the case of a direct current machine it will be apparent to those skilled in the art that the current transformer 22 and rectifier bridge 21 may be replaced by a series resistor.

While I have described what I at present consider the preferred embodiment of my invention, it will be obvious to those skilled in the art that various changes and modifications may be made without departing from my invention and I, therefore, aim in the appended claim to cover all such changes and modifications as fall within the true spirit and scope of my invention.

What I claim as new and desire to secure by Letters Patent of the United States, is:—

In combination, an alternating current machine provided with armature and field windings, an energizing circuit for said field winding including an electric valve provided with a control grid, an impedance phase shifting circuit including a reactor provided with a saturating winding, a connection for exciting said control grid from said phase shifting circuit, a current transformer connected in circuit with said armature winding, and rectifying means for energizing said saturating winding from said current transformer.

In witness whereof, I have hereunto set my hand.

HARRY R. CRAGO.